United States Patent [19]

Egawa et al.

[11] Patent Number: 4,745,614
[45] Date of Patent: May 17, 1988

[54] SILENT DISCHARGE TYPE LASER DEVICE

[75] Inventors: Akira Egawa; Hakaru Mizoguchi; Kiyonori Matsuno, all of Hiratsuka; Tatsuya Ariga, Ninomiya; Ryoichi Nodomi, Hiratsuka, all of Japan

[73] Assignee: Kabushiki Kaisha Komatsu Seisakusho, Tokyo, Japan

[21] Appl. No.: 898,224

[22] Filed: Aug. 20, 1986

[51] Int. Cl.$^4$ .............................................. H01S 3/13
[52] U.S. Cl. ...................................... 372/85; 372/31; 372/33; 372/38; 372/87
[58] Field of Search ...................... 372/87, 85, 81, 33, 372/38, 29, 31

[56] References Cited

FOREIGN PATENT DOCUMENTS

| 0065492 | 4/1984 | Japan | 372/38 |
| 0223179 | 11/1985 | Japan | 372/33 |
| 0223180 | 11/1985 | Japan | 372/33 |
| 0260172 | 12/1985 | Japan | 372/87 |

Primary Examiner—James W. Davie
Assistant Examiner—Xuan T. Vo
Attorney, Agent, or Firm—Diller, Ramik & Wight

[57] ABSTRACT

A silent discharge type laser device which comprises a detector for detecting the amount of electric charges passed between electrodes and controlling means for controlling an output current or voltage of a power supply so that a charge amount detected by the detector is equal to a target level, thereby keeping the passage charge amount always constant.

4 Claims, 7 Drawing Sheets

POWER SOURCE CONTROL MEANS

LASER OUTPUT (Wr.)

DISCHARGING POWER (Wd)

— BEFORE CHANGE OF $C_d$
--- AFTER CHANGE OF $C_d$

FIG. 12

SILENT DISCHARGE TYPE LASER DEVICE

BACKGROUND OF THE INVENTION

1. Field of the Invention

The present invention relates to a laser device of a silent discharge type in which silent discharging is used to excite laser oscillation.

2. Description of the Prior Art

Figure 4A:
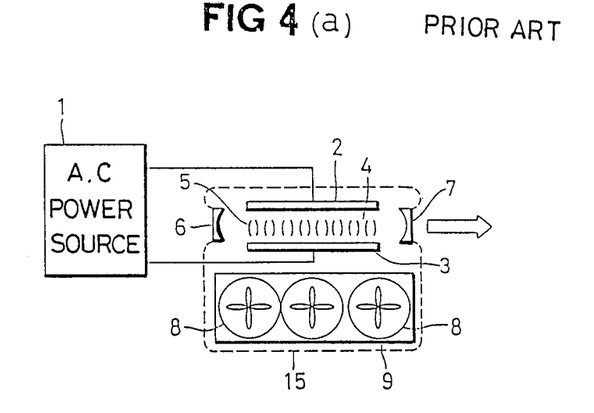
FIG. 4(a) is a front view and FIG. 4(b) is a side view thereof.
Figure 4B:
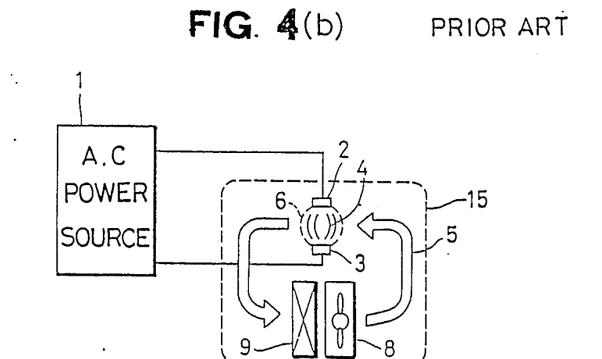

Referring to FIG. 4, there is shown a $CO_2$ laser device in which silent discharging is used to promote laser oscillation. More specifically, FIGS. 4 (a) and (b) are front and side views of the laser device showing its general arrangement wherein when an output of an AC power source 1 is applied between a pair of electrodes 2, 3 coated with dielectric material, silent discharge takes place in a discharging space 4 defined by the electrodes and acts to excite laser medium gas 5 trapped in the space 4. As a result, laser oscillation occurs in an optical resonator which comprises a totally-reflective mirror 6 and a semi-transparent (that is, a partially-reflective) mirror 7. Such laser oscillation is partially taken out as a laser beam through the semi-transparent mirror 7.

The above-mentioned laser medium gas is passed through the discharging space 4 at a velocity of several tens to several hundreds m/s by blowers 8, cooled by a heat exchanger 9 and sent again to the discharging space 4.

Figure 5:
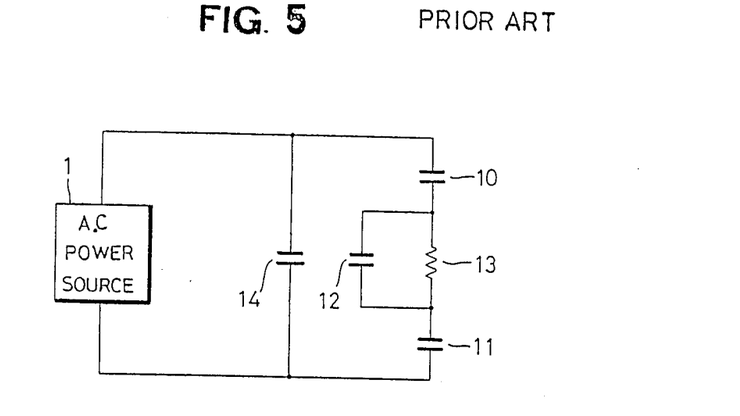
FIGS. 5 and 6 are equivalent circuits of the laser device shown in FIG. 4, respectively.
Figure 6:
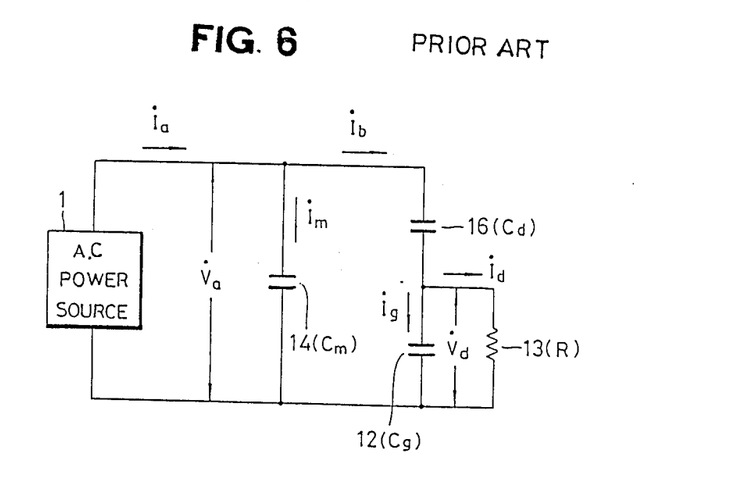

Shown in FIG. 5 is an electrical equivalent circuit of the foregoing laser device in such a condition that silent discharge is occurring between the electrodes 2 and 3. In the drawing, reference numerals 10 and 11 represent the capacitances of the dielectric-coat layers of the electrodes 2 and 3 respectively, 12 the capacitance of a gap between the electrodes 2 and 3, 13 the equivalent resistance of silent discharge zone of the space 4, 14 a stray capacitance present in wiring lines and a chamber 15. FIG. 6 is an equivalent circuit when the capacitances 10 and 11 in FIG. 5 are combined to form a single capacitance 16.

These equivalent circuits have been found by the inventors of the present invention as a result of their studies, and it has been found that such equivalent circuits are very useful in explaining the discharging characteristic of the laser device in the laser medium gas when the frequency of the power source 1 exceeds 10 KHz.

Figure 7:
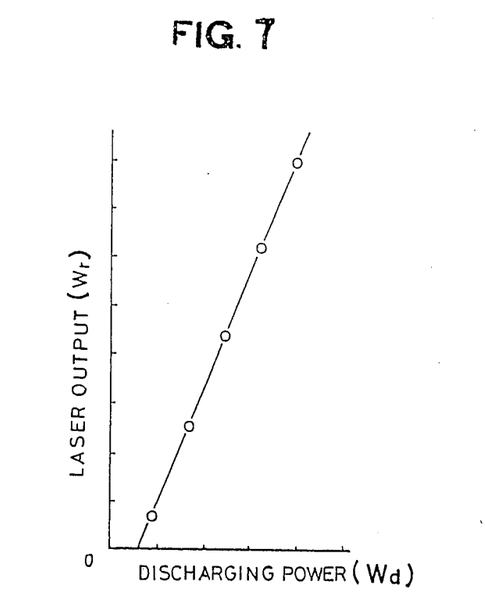
FIG. 7 is a graph showing, as an example, a relationship between discharging power and laser output.

More specifically, FIG. 7 shows a laser oscillation characteristic, that is, a relationship between a silent discharging power $W_d$ (input power) consumed by the equivalent resistance 13 and a laser output $W_r$. It will be seen from FIG. 7 that a constant laser output can be obtained by controlling the discharge power $W_d$ to be constant.

Figure 8:
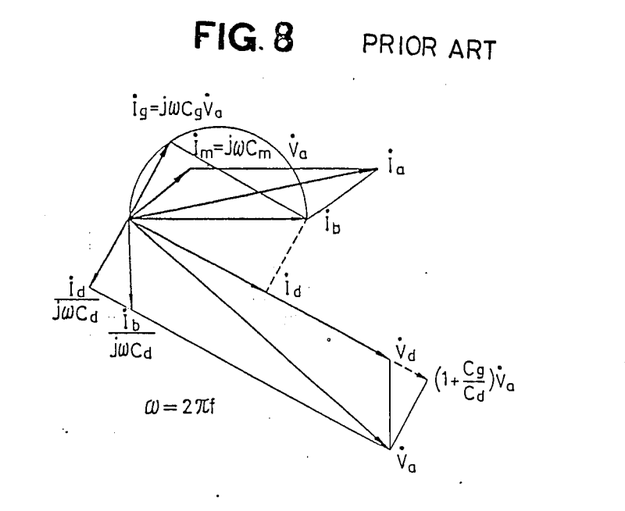
FIG. 8 is a vector diagram for explanation of the operation of the circuit shown in FIG. 6.

Assuming that the values of the capacitances 12, 14 and 16 are $C_g$, $C_m$ and $C_d$ respectively and the value of the equivalent resistance 13 is R in FIG. 6, vector relationships between the current and voltage at various points in FIG. 6 are as shown in FIG. 8 wherein physical quantities with dots are in the form of complex while physical quantities without dots are in the form of absolute value (effective value when phase is not taken into consideration).

From FIG. 8, the discharging power $W_d$ is expressed by:

$$W_d = V_d \cdot I_d \quad \ldots \quad (1)$$

where, $V_d$ is a terminal-to-terminal voltage across the equivalent resistance 13 and $I_d$ is a current flowing through the resistance 13. It will be appreciated from the equation (1) that $V_d$ is a constant, determined by the discharging conditions and thus when the current $I_d$ is made constant, the discharging power $W_d$, i.e., the laser output can be made constant.

Figure 9:
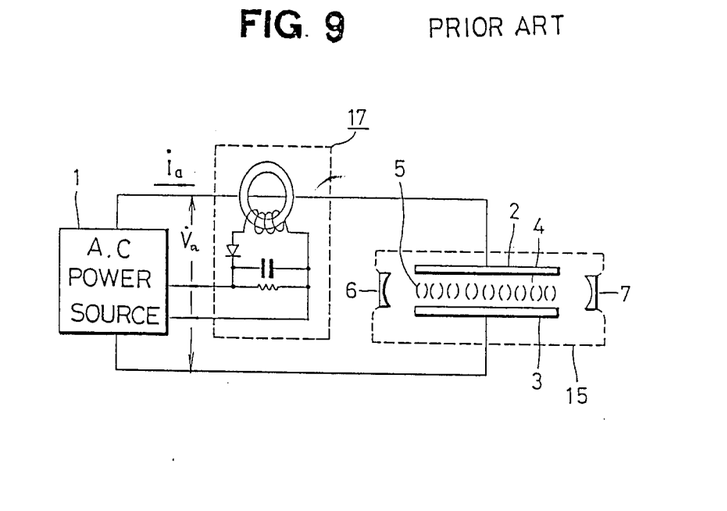
FIGS. 9 and 10 are circuit diagrams of prior art laser devices comprising means for controlling their discharging power, respectively.
Figure 10:
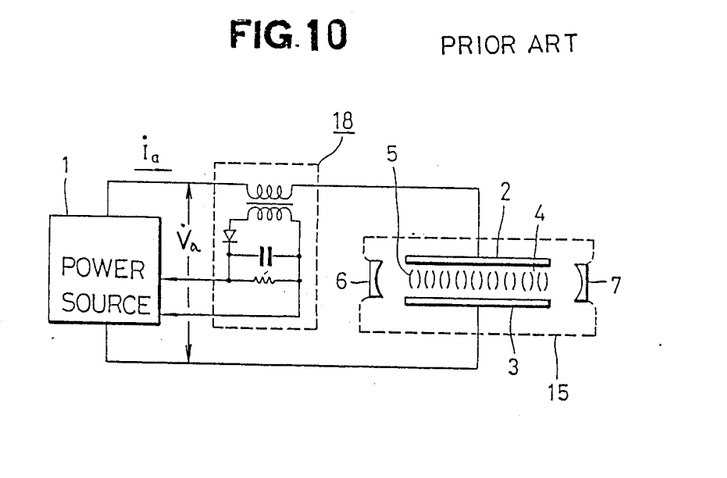

Referring to FIGS. 9 and 10, there are shown other prior-art laser devices in which an output voltage $\dot{V}_a$ of a power source 1 is controlled so that an output current $\dot{I}_a$ of the power source 1 detected by respective current detectors 17 and 18 is equal to a set value, as proposed, for example, in Japanese Patent Laid-Open Publication No. 147185/83. However, these laser devices are defective in that it is impossible to detect a variation in the current $\dot{I}_d$ resulting from a variation in the stray impedance (based on the capacitance $C_m$ in FIG. 6) present in lines wired between the power source 1 and the laser oscillation section or resulting from a variation in the capacitance $C_d$, thus impeding the sufficient supression of variation of the discharging power $W_d$.

Figure 11:
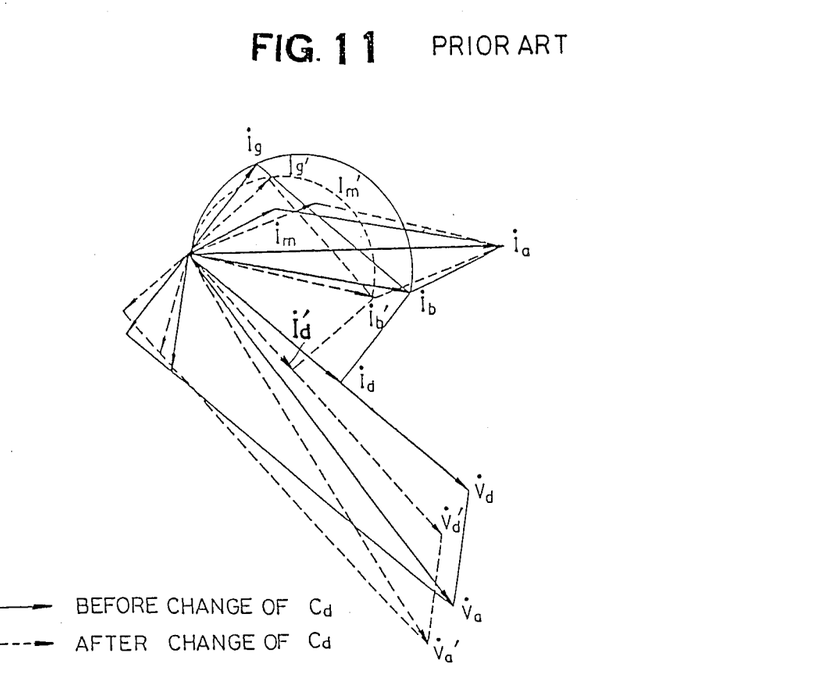
FIG. 11 is a vector diagram showing a relationship between the current and voltage at various points when dielectric coat layers are varied in capacitance in the laser devices of FIGS. 9 and 10.

Shown in FIG. 11 in a vector representation is a relationship between the current and voltage at the various points of FIGS. 9 and 10 when the above-mentioned capacitance $C_d$ is varied.

Figure 12:
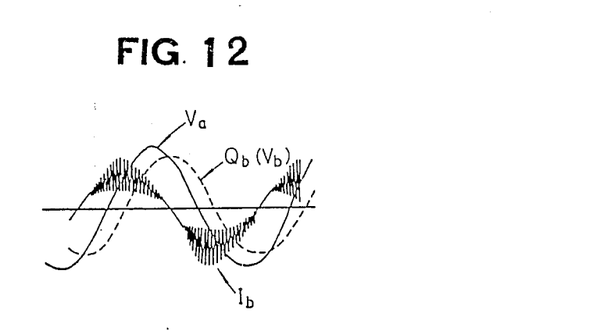
FIG. 12 shows waveforms, as an example, of an output voltage of a power source, a silent discharge current and a variation in the amount of electric charge detected by a charge-amount detecting capacitor, respectively.

Generally, the silent discharge current $\dot{I}_b$ shown in FIG. 6 contains, as shown in FIG. 12, such pulse current components that are considerably high in frequency than the power source 1 and that vary irregularly. In such a case, the foregoing prior art devices have had a problem that it is difficult to detect reliably the above-mentioned pulse current due to the frequency characteristics of the current detectors 17 and 18, resulting in a poor controllability.

Accordingly, the present invention is directed to eliminating such problems in the prior art. To this end, in accordance with the present invention, there are provided a means for detecting the amount of electric charges passed between electrodes and a means for controlling an output voltage or current of a power source so that the detected value of the charge-amount detecting means is equal to a present value. The present invention can control its discharging power to be constant regardless of variations in the capacitances of dielectric material layers coated on the discharge electrodes or variations in the capacitances present in the wiring lines and chamber. Further, since the charge amount is accurately detected while not affected by such pulse current, the present invention can provide a high control accuracy.

BRIEF DESCRIPTION OF THE DRAWINGS

FIG. 4 shows an arrangement of an ordinary silent discharge type laser device, in which

DESCRIPTION OF PREFERRED EMBODIMENT

Figure 1:
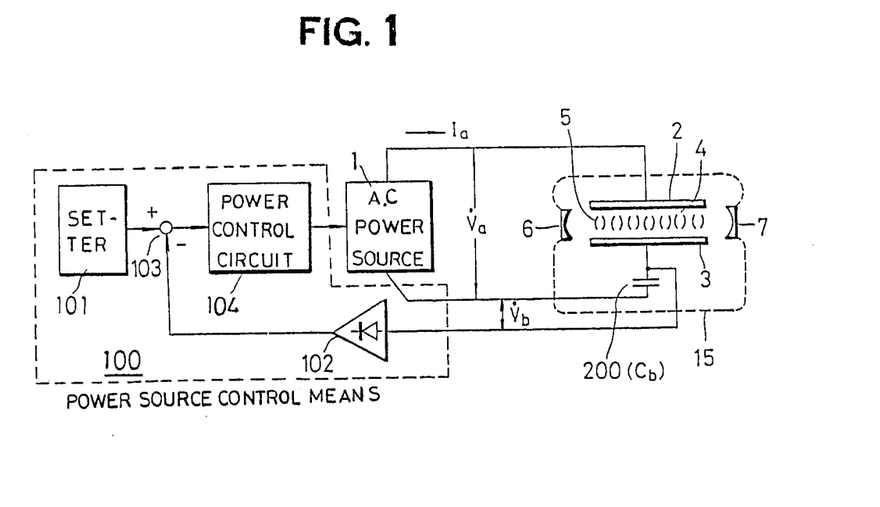
FIG. 1 is a circuit diagram showing an embodiment of a silent discharge type laser device in accordance with the present invention.
Figure 2:
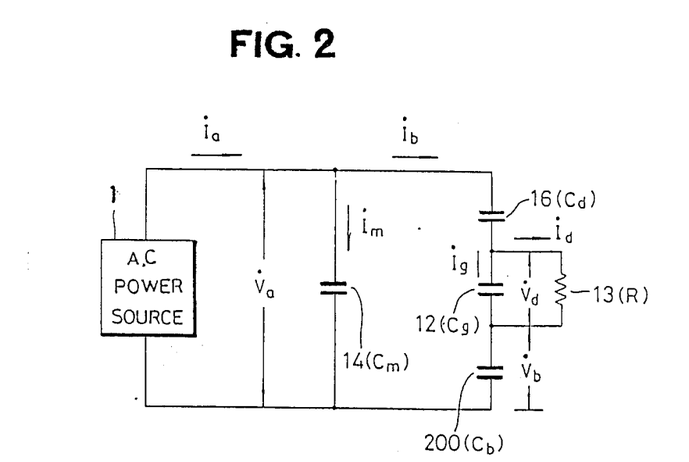
FIG. 2 is an equivalent circuit of the laser device of FIG. 1.

FIG. 1 shows an embodiment of a silent discharge type laser device in accordance with the present invention and FIG. 2 is an equivalent circuit of the same laser device. In the drawings, the same elements as those shown in FIGS. 5 and 6 are denoted by the same reference numerals or symbols.

In the illustrated embodiment, the output voltage Va or output current Ia of a power source 1 is so controlled that the integration of the current $\dot{I}_b$ passed between the electrodes 2 and 3, that is, the charge amount $\dot{Q}_b$ is equal to a target value.

The above charge amount $\dot{Q}_b$ can be detected by various means, but in the illustrated embodiment, the charge amount $\dot{Q}_b$ is detected on the basis of the terminal-to-terminal voltage $\dot{V}_b$ across a capacitor 200 which is inserted in a path through which the current $\dot{I}_b$ flows. It is further desirable that the capacitor 200 is disposed as close to the electrodes 3 and 4 as possible.

The amount of charge accumulated in the capacitor 200 is represented by the integration of the current $\dot{I}_b$ and the terminal-to-terminal voltage $\dot{V}_b$ across the capacitor 200 is proportional to the such charge amount. Hence, the charge amount $\dot{Q}_b$ can be detected on the basis of the terminal-to-terminal voltage $\dot{V}_b$.

A power source control means 100 includes a setter 101 for setting a target value for the charge amount passed across the electrodes 2 and 3, a circuit 102 for receiving the terminal-to-terminal voltage $\dot{V}_b$ to generate the absolute value (actually, which is an average of effective values or absolute values) of the voltage $\dot{V}_b$, a subtractor 103 for finding a difference between the output of the absolute value circuit 102 and the output of the charge-amount setter 101, and a power control circuit 104 for receiving the difference and increasing or decreasing the output voltage $\dot{V}_a$ or output current $\dot{I}_a$ of the power source 1 so that the difference at 103 becomes zero.

The output of the absolute value circuit 102 corresponds to the above charge amount $\dot{Q}_b$. Therefore, according to the present embodiment, the output voltage $\dot{V}_a$ or output current $\dot{I}_a$ is so controlled that the charge amount $Q_b$ passed through the discharge space 4 is kept always at a target value.

Figure 3:
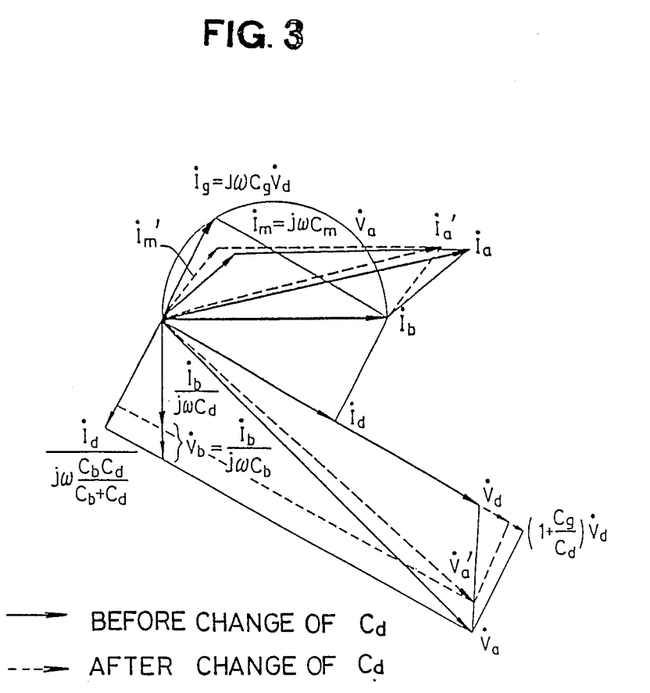
FIG. 3 is a vector diagram for explanation of the operation of the circuit of FIG. 2.

Shown in FIG. 3 is a vector diagram showing a relationship between the current and voltage at various points in the equivalent circuit of FIG. 2. A relationship between the charge amount $\dot{Q}_b$ and the discharging power $W_d$ is readily found from the vector diagram of FIG. 3. That is, $$\dot{I}_b = \dot{I}_d + j\omega C_g \cdot \dot{V}_d \tag{2}$$

$$\dot{V}_b = \dot{I}_b / j\omega C_b \tag{3}$$

$$W_b = \dot{I}_d \cdot \dot{V}_d = I_{phd} \, d \cdot V_d \tag{4}$$

$$\dot{Q}_b = \dot{I}_b / j\omega = C_b \cdot \dot{V}_b \tag{5}$$

Accordingly, the discharging power $W_d$ is expressed as follows:

$$W_d = \omega \cdot V_d \cdot \sqrt{Q_b^2 - C_g^2 \cdot V_d^2} \tag{6}$$

Since the quantities $C_g$ and $\dot{V}_d$ in the equation (6) are constants determined by the discharging conditions, if the quantity $Q_b$ is constant then the discharging power $W_d$ becomes constant.

Shown by dotted lines in FIG. 3 are the currents and voltages at the various points in the laser device of the foregoing embodiment when the dielectric layers coated on the discharge electrodes 2 and 3 are increased in the capacitance $C_d$. In the illustrated embodiment, with the charge amount $\dot{Q}_b$ controlled to be constant, the current $\dot{I}_d$ can be made constant even when the capacitance $C_d$ is varied. Therefore, the discharging power $W_d$ is kept constant regardless of a variation in the capacitance $C_d$.

In the similar way, even when the capacitance $C_m$ is varied, the discharging power $W_d$ is kept constant. In this embodiment, further, the voltage $V_b$ shown in the equation (5) has such a waveform close to sinusoidal one as shown by a dotted line in FIG. 12, so that the charge amount $\dot{Q}_b$ can be detected while not affected by any pulse current, whereby highly accurate control can be performed over the discharging power $W_d$.

As clear from the foregoing explanation, the power source control means 100 and the power source 1 cooperate to function as a constant-power supply which controls the discharging power $W_d$ to be constant.

How to detect the charge amount $\dot{Q}_b$ is not restricted to that disclosed in the foregoing embodiment with use of the capacitor 200, but there may be employed various methods, for example, of detecting the current $\dot{I}_b$ and converting it to a corresponding charge amount with use of an integrator, or of inserting a resistance or a current transformer instead of the capacitor 200 and integrating the terminal-to-terminal voltage across the resistance or the output voltage of the current transformer to detect a corresponding charge amount.

In addition, although both of the discharge electrodes 3 and 4 have been coated with dielectric material in the foregoing embodiment, it goes without saying that the present invention can be applied to a silent discharge type laser device in which either one of the electrodes is coated with the dielectric.

What is claimed is:

1. A silent discharge type laser device including a pair of discharging electrodes at least one of which is coated with dielectric material, a laser gas medium between said electrodes, a power source for applying an AC voltage between said discharge electrodes to cause silent discharging therebetween, and an optical resonator having a totally-reflective mirror and a semi-transparent mirror which mirrors delimit a discharging space in a relation opposed to each other, wherein said silent discharging is used to promote laser oscillation; said laser device being characterized by:

means for setting a target value of electric charge passed between said discharging electrodes; means for detecting the amount of electric charge passed between said discharging electrodes; and means for controlling output of said power source in response to the detected value of said electric charge-amount detecting means to equalize the target value and the detected electric charge-amount thereby establishing a constant laser output.

2. A silent discharge type laser device as set forth in claim 1, wherein said electric charge-amount detecting means detects an integrated sum of a current passed between said discharging electrodes.

3. A silent discharge type laser device as set forth in claim 2, wherein said electric charge-amount detecting means is a capacitor which accumulates therein electric charges which are passed through said discharging electrodes.

4. A silent discharge type laser device as set forth in claim 1, wherein said control means includes means for detecting a difference between said target value and the detected value of said electric charge-amount detecting means, and means for changing the output current or the output voltage of said power source until said difference becomes zero.

* * * * *